US012598002B2

(12) United States Patent
Saad et al.

(10) Patent No.: US 12,598,002 B2
(45) Date of Patent: Apr. 7, 2026

(54) CONTROL OF A MODULATION INDEX OF AN OPTICAL SIGNAL

(71) Applicant: Lumentum Technology (UK) Limited, Northamptonshire (GB)

(72) Inventors: Ricardo Saad, San Jose, CA (US); Chiachen Chang, Saratoga, CA (US)

(73) Assignee: Lumentum Technology UK Limited, Northamptonshire (GB)

( * ) Notice: Subject to any disclaimer, the term of this patent is extended or adjusted under 35 U.S.C. 154(b) by 382 days.

(21) Appl. No.: 18/478,417

(22) Filed: Sep. 29, 2023

(65) Prior Publication Data

US 2025/0007616 A1     Jan. 2, 2025

Related U.S. Application Data

(60) Provisional application No. 63/511,066, filed on Jun. 29, 2023.

(51) Int. Cl.
 H04B 10/50 (2013.01)
 H04B 10/564 (2013.01)
(52) U.S. Cl.
 CPC ....... H04B 10/5057 (2013.01); H04B 10/564 (2013.01)
(58) Field of Classification Search
 None
 See application file for complete search history.

(56) References Cited

U.S. PATENT DOCUMENTS

| | | | | |
|---|---|---|---|---|
| 5,432,629 A | * | 7/1995 | Shikada | ............... H04B 10/572 |
| | | | | 398/198 |
| 7,272,271 B2 | * | 9/2007 | Kaplan | .............. H04B 10/5053 |
| | | | | 359/254 |
| 7,362,972 B2 | | 4/2008 | Yavor et al. | |
| 7,630,631 B2 | | 12/2009 | Aronson et al. | |
| 7,697,580 B2 | * | 4/2010 | Smith | ................... H01S 5/4031 |
| | | | | 372/29.011 |
| 8,509,626 B2 | * | 8/2013 | Wang | ............... H04B 10/25751 |
| | | | | 398/183 |
| 9,344,194 B2 | * | 5/2016 | Kim | ................... H04B 10/5053 |
| 9,998,254 B2 | | 6/2018 | DeAndrea | |
| 10,103,815 B2 | * | 10/2018 | Shankar | ............... H04B 10/516 |
| 10,419,116 B2 | | 9/2019 | Coli et al. | |
| 10,615,877 B2 | * | 4/2020 | Saad | ............... H04B 10/50593 |
| 2003/0025957 A1 | | 2/2003 | Jayakumar | |
| 2004/0136055 A1 | | 7/2004 | Michie et al. | |
| 2014/0241727 A1 | | 8/2014 | Lim et al. | |
| 2019/0052392 A1 | | 2/2019 | DeAndrea | |

* cited by examiner

*Primary Examiner* — Jai M Lee
(74) *Attorney, Agent, or Firm* — Harrity & Harrity, LLP

(57) ABSTRACT

An optical transmitter may include a transmitter device configured to modulate an optical signal with a data signal. The optical transmitter may include a controller configured to output the data signal to the transmitter device, where the data signal has a modulation amplitude to control a modulation of the optical signal by the transmitter device. The controller may be configured to obtain a feedback signal based on outputting the data signal to the transmitter device. The controller may be configured to determine, based on the feedback signal, an actual modulation index of the optical signal modulated with the data signal. The controller may be configured to adjust the modulation amplitude of the data signal based on a difference between the actual modulation index and a target modulation index.

20 Claims, 4 Drawing Sheets

200

300

Bus
310

Memory
330

Processor
320

Reception
Component
340

Transmission
Component
350

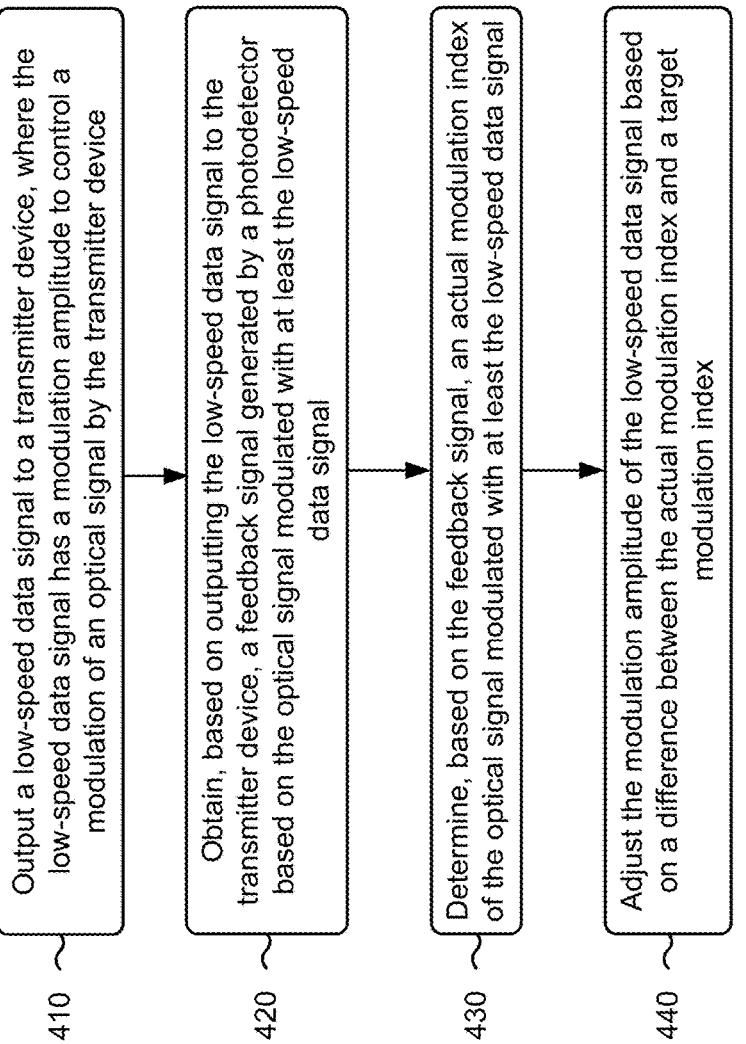

400

410 — Output a low-speed data signal to a transmitter device, where the low-speed data signal has a modulation amplitude to control a modulation of an optical signal by the transmitter device 420 — Obtain, based on outputting the low-speed data signal to the transmitter device, a feedback signal generated by a photodetector based on the optical signal modulated with at least the low-speed data signal 430 — Determine, based on the feedback signal, an actual modulation index of the optical signal modulated with at least the low-speed data signal 440 — Adjust the modulation amplitude of the low-speed data signal based on a difference between the actual modulation index and a target modulation index

FIG. 4

CONTROL OF A MODULATION INDEX OF AN OPTICAL SIGNAL

CROSS-REFERENCE TO RELATED APPLICATION

This patent application claims priority to U.S. Provisional Patent Application No. 63/511,066, filed on Jun. 29, 2023, and entitled "REMOTE SENSE MODULATION INDEX CONTROL USING PHOTODETECTOR AS FEED-BACK." The disclosure of the prior application is considered part of and is incorporated by reference into this patent application.

TECHNICAL FIELD

The present disclosure relates generally to optical transceivers and to control of a modulation index of an optical signal.

BACKGROUND

An optical module (e.g., an optical transceiver) capable of achieving high-speed data communication may be used in a data center, a node of an optical network, or the like. An optical transceiver may include, as main components, a light emitting function portion (transmitter optical subassembly, TOSA) that converts electrical signals into optical signals and a light receiving function portion (receiver optical subassembly, ROSA) that, in turn, converts optical signals into electrical signals for high-speed data communication in an optical network, such as a fiber optic network.

SUMMARY

In some implementations, an optical transmitter includes an optical source configured to output an optical signal that is to be modulated with a primary data signal and a secondary data signal, where a data rate of the primary data signal is greater than a data rate of the secondary data signal. The optical transmitter may include a semiconductor optical amplifier configured to modulate the optical signal with the secondary data signal. The optical transmitter may include an optical modulator configured to modulate the optical signal with the primary data signal. The optical transmitter may include a photodetector configured to generate a feedback signal based on the optical signal modulated with at least the secondary data signal. The optical transmitter may include a controller configured to output the secondary data signal to the semiconductor optical amplifier, where the secondary data signal has a modulation amplitude to control a modulation of the optical signal by the semiconductor optical amplifier. The controller may be configured to obtain the feedback signal based on outputting the secondary data signal to the semiconductor optical amplifier. The controller may be configured to determine, based on the feedback signal, an actual modulation index of the optical signal modulated with at least the secondary data signal. The controller may be configured to adjust the modulation amplitude of the secondary data signal based on a difference between the actual modulation index and a target modulation index.

In some implementations, an optical transmitter includes a transmitter device configured to modulate an optical signal with a data signal. The optical transmitter may include a controller configured to output the data signal to the transmitter device, where the data signal has a modulation amplitude to control a modulation of the optical signal by the transmitter device. The controller may be configured to obtain a feedback signal based on outputting the data signal to the transmitter device. The controller may be configured to determine, based on the feedback signal, an actual modulation index of the optical signal modulated with the data signal. The controller may be configured to adjust the modulation amplitude of the data signal based on a difference between the actual modulation index and a target modulation index.

In some implementations, a method includes outputting, by a controller, a low-speed data signal to a transmitter device, where the low-speed data signal has a modulation amplitude to control a modulation of an optical signal by the transmitter device, where the optical signal is to be modulated with a high-speed data signal and the low-speed data signal, and where the low-speed data signal indicates diagnostic information, associated with a controlled network node of an optical network, and for a controlling network node of the optical network. The method may include obtaining, by the controller and based on outputting the low-speed data signal to the transmitter device, a feedback signal generated by a photodetector based on the optical signal modulated with at least the low-speed data signal. The method may include determining, by the controller and based on the feedback signal, an actual modulation index of the optical signal modulated with at least the low-speed data signal. The method may include adjusting, by the controller, the modulation amplitude of the low-speed data signal based on a difference between the actual modulation index and a target modulation index.

BRIEF DESCRIPTION OF THE DRAWINGS

FIG. 4 is a flowchart of an example process associated with control of a modulation index of an optical signal.

DETAILED DESCRIPTION

Figure 1:
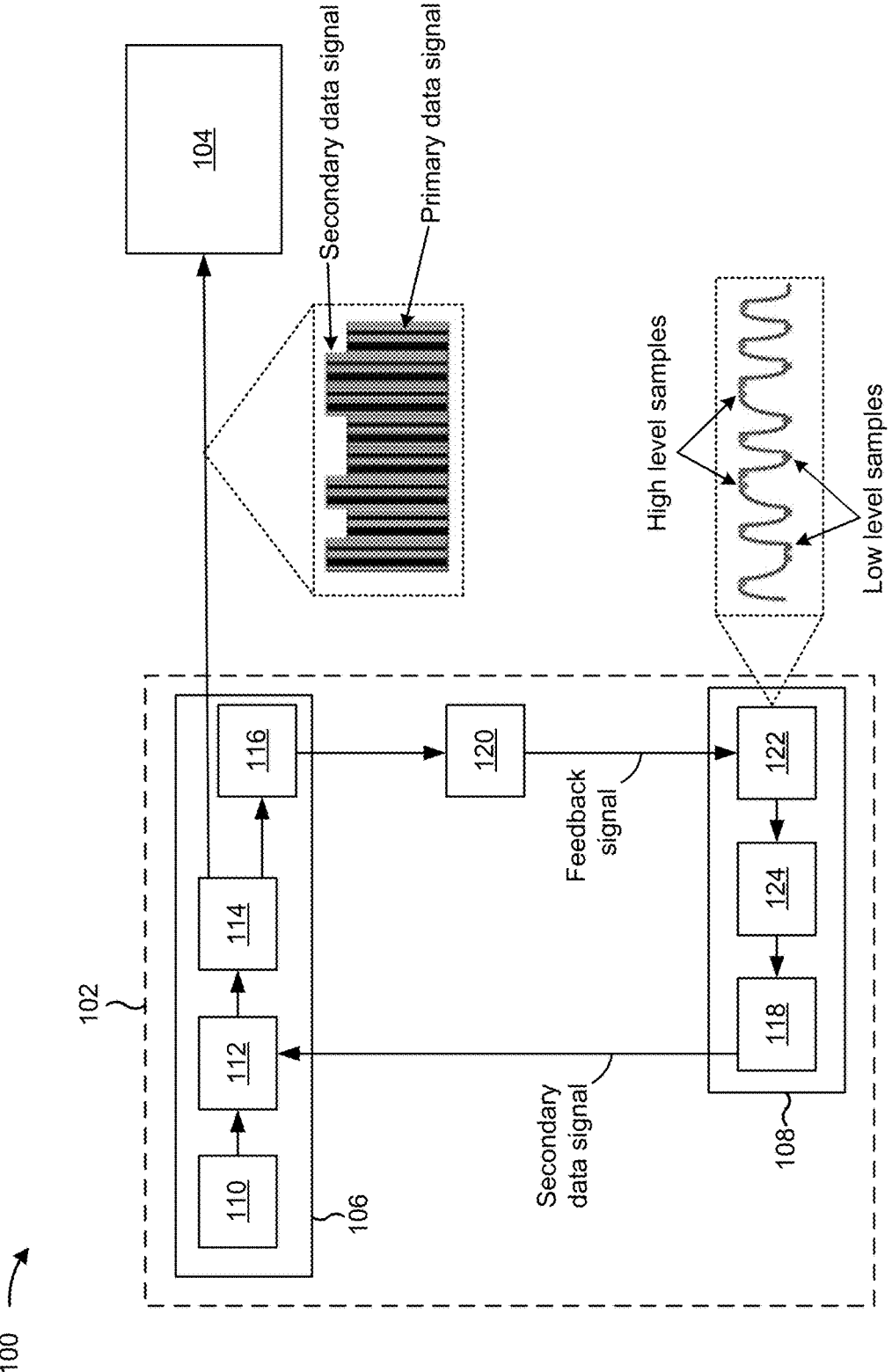
FIG. 1 is a diagram of an example associated with control of a modulation index of an optical signal.

The following detailed description of example implementations refers to the accompanying drawings. The same reference numbers in different drawings may identify the same or similar elements.

Network nodes of an optical network may exchange information to maintain a performance of the network at a high level independently of the network nodes' normal operation of transmitting high-speed data through the network. In particular, a transmitting network node may transmit (e.g., using an optical transceiver) messages that include diagnostic information to a receiving network node. Such messages may be low-speed data and may be generated by modulating an optical carrier signal with a low-speed data signal (e.g., using amplitude modulation) over a primary high-speed data signal.

A performance of the low-speed data signal, as well as the high-speed data signal, may be affected by variations to the modulation index of the modulated signal with respect to the low-speed data signal. For example, when the modulation index of the modulated signal is relatively low, the low-speed data signal may be lost over long transmission distances. However, a relatively high modulation index may result in a penalty to the high-speed data signal. Variations to the modulation index may be caused by fluctuating channel conditions, voltage fluctuations, temperature fluctuations, or the like.

Some implementations described herein enable a modulation index of a modulated optical signal, with respect to a low-speed data signal, to be maintained at a relatively constant value. For example, the modulation index may be maintained at a relatively constant value under fluctuating channel conditions, voltage fluctuations, and/or temperature fluctuations, among other examples. In some implementations, an optical transmitter (e.g., of an optical transceiver) may include a transmitter device (e.g., transmitter chip) and a controller.

The controller may output a data signal (e.g., a low-speed data signal) to the transmitter device, and the transmitter device may modulate an optical signal (e.g., an optical carrier signal) with the data signal (e.g., using amplitude modulation). The data signal (e.g., an electrical signal) may have a modulation amplitude to control how the optical signal is modulated. The controller, based on outputting the data signal to the transmitter device, may receive a feedback signal from a photodetector configured to monitor the modulated optical signal output by the transmitter device. Based on the feedback signal, the controller may determine an actual modulation index associated with the optical signal modulated with the data signal. Accordingly, the controller may adjust the modulation amplitude (e.g., by adjusting current) of the data signal based on a difference between the actual modulation index and a target modulation index (e.g., the amount of the adjustment is intended to reduce the difference between the actual modulation index and the target modulation index to zero). In this way, deviations from the target modulation index are corrected in real time to maintain the actual modulation index relatively constant (e.g., at or near the target modulation index), even under fluctuating channel conditions, voltage fluctuations, and/or temperature fluctuations, among other examples.

FIG. 1 is a diagram of an example 100 associated with control of a modulation index of an optical signal. As shown, example 100 includes an optical transmitter 102 and an optical receiver 104. The optical transmitter 102 may be remotely located from the optical receiver 104 (e.g., the optical transmitter 102 and the optical receiver 104 may not be co-located) in an optical communications network. In some implementations, the optical transmitter 102 may be included in (e.g., a component of) a first optical transceiver, and the optical receiver 104 may be included in (e.g., a component of) a second optical transceiver in the optical communications network. An optical transceiver may be associated with a small form factor (e.g., SFP, XFP, SFP+, SFP28, QSFP28, SFP-DD, SFP56, OSFP 800G, among many other examples).

In some implementations, the optical transmitter 102 and the optical receiver 104 may be part of a communication system that is independent of primary high-speed data communications by the optical transmitter 102 and/or the optical receiver 104, but using the same optical communication network. This communication between the optical transmitter 102 and the optical receiver 104 may be associated with low-speed data communication (e.g., in a range from 5 kilobits per second (kbps) to 10 kbps, or from 1 kbps to 300 kbps). Here, low-speed data may be transmitted using a low-speed data signal modulated over a primary high-speed data signal associated with high-speed data communication (e.g., in a range from 1 gigabit per second (Gbps) to 28 Gbps, or more). The low-speed data may include messages with network information, diagnostic information, and/or other information. In some implementations, the low-speed data signal may be based on Manchester encoding. The high-speed data signal may be referred to herein as a "primary data signal" and the low-speed data signal may be referred to herein as a "secondary data signal." In some implementations, the primary data signal and the secondary data signal may have a different relationship, and/or may be used to communicate different data, than that described above, provided that a frequency (e.g., a data rate) of the primary data signal is greater than a frequency (e.g., a data rate) of the secondary data signal. For example, the data rate of the primary data signal may be greater than or equal to 1 Gbps, and the data rate of the secondary data signal may be less than or equal to 10 kbps.

The optical transmitter 102 may include a transmitter device 106 (e.g., a transmitter chip) and a controller 108. The transmitter device 106 may be configured to modulate an optical signal (e.g., an optical carrier signal) with a data signal. For example, the transmitter device 106 may be configured to modulate an optical signal with a primary data signal and a secondary data signal (e.g., where a frequency of the primary data signal is greater than a frequency of the secondary data signal). In one example, the transmitter device 106 may include an optical source 110, an optical amplifier 112, and/or an optical modulator 114 (e.g., of a transmitter optical subassembly (TOSA)).

The optical source 110 may be configured to output an optical signal (e.g., an optical carrier signal) that is to be modulated with the primary data signal and the secondary data signal. The optical source may be a laser source, such as a laser diode. The optical source 110 may be configured to output the optical signal to the optical amplifier 112. The optical amplifier 112 may be configured to modulate the optical signal with the secondary data signal (e.g., associated with low-speed data communication). For example, the optical amplifier 112 may use amplitude modulation to modulate the optical signal with the secondary data signal. The secondary data signal may be output by the controller 108 to the optical amplifier 112, as described below. The optical amplifier 112 may include a semiconductor optical amplifier, or another suitable type of optical amplifier.

The optical modulator 114 may be configured to modulate the optical signal with the primary data signal (e.g., associated with high-speed data communication). For example, the optical amplifier 112 may be configured to output the optical signal modulated with the secondary data signal to the optical modulator 114, and the optical modulator 114 may be configured to modulate the optical signal, modulated with the secondary data signal, with the primary data signal. As an example, the optical signal may be modulated with the primary data signal using a first type of modulation (e.g., a phase modulation or a phase and amplitude modulation), and the optical signal may be modulated with the secondary data signal using a second type of modulation (e.g., an amplitude modulation). Alternatively, the primary data signal and the secondary data signal may use the same type of modulation (e.g., an amplitude modulation). The primary data signal may be output by the controller 108, or by a different controller of the optical transmitter 102, to the optical modulator 114. The optical modulator 114 may have a single output configured to output the optical signal modulated with the primary data signal and the secondary data signal. Alternatively, the optical modulator 114 may have complementary outputs (e.g., two outputs) each configured to output the optical signal modulated with the primary data signal and the secondary data signal.

The optical modulator 114 may include a Mach-Zehnder modulator, nested Mach-Zehnder modulators, or another suitable type of optical modulator. For example, the optical modulator 114 may include an in-phase and quadrature (IQ) modulator. In some implementations, the optical modulator 114 may provide quadrature phase shift keying (QPSK) modulation of the primary data signal on the optical signal.

In some implementations, the transmitter device 106 may have a different configuration than that described above. For example, an order of the optical amplifier 112 and the optical modulator 114 in the transmitter device 106 may be reversed. Here, the optical signal may be modulated with the primary data signal at the optical modulator 114, the optical modulator 114 may output the optical signal modulated with the primary data signal to the optical amplifier 112, and the optical amplifier 112 may modulate the optical signal, modulated with the primary data signal, with the secondary data signal. As another example, the transmitter device 106 may include a driver for the optical source 110 configured to directly modulate the optical signal with the primary data signal and/or the secondary data signal. Here, the optical amplifier 112 and/or the optical modulator 114 may be omitted from the transmitter device 106 and/or may be configured to perform a different function than that described herein (e.g., the optical amplifier 112 may be configured to amplify the optical signal without imposing modulation on the optical signal).

The transmitter device 106 may be configured to transmit the optical signal modulated with the primary data signal and the secondary data signal from the optical transmitter 102. For example, the optical transmitter 102 may transmit the modulated optical signal to the optical receiver 104. The optical receiver 104 may demodulate the modulated optical signal to recover the secondary data signal (as well as the primary data signal). In some implementations, the secondary data signal may indicate diagnostic information (e.g., indicating an optical power of the optical transmitter 102, a status of the optical transmitter 102, a wavelength used by the optical transmitter 102, or the like), associated with a controlled network node, that is intended for a controlling network node (e.g., a network node that provides control information to the controlled network node). In some implementations, the secondary data signal may indicate control information, generated by the controlling network node, that is intended for the controlled network node. For example, an optical transceiver of the controlled network node may transmit an optical signal modulated with a primary data signal and a secondary data signal (as described herein), indicating diagnostic information, to an optical transceiver of the controlling network node. Continuing with the example, in response, the optical transceiver of the controlling network node may transmit an optical signal modulated with a primary data signal and a secondary data signal (as described herein), indicating control information, to the optical transceiver of the controlled network node. This procedure, sometimes referred to as a "remote sensing" procedure, may enable reading and/or writing of control registers of the controlled network node (e.g., based on the diagnostic information).

The optical transmitter 102 may include a photodetector 116. For example, the photodetector 116 may be included in the transmitter device 106, or may be external to the transmitter device 106. The photodetector 116 may be configured to generate a feedback signal based on the optical signal modulated with at least the secondary data signal (e.g., the optical signal modulated with the primary data signal and the secondary data signal, or the optical signal modulated with only the secondary data signal, prior to modulation with the primary data signal). The photodetector 116 may include a photodiode, a phototransistor, or the like.

In some implementations, the photodetector 116 may be configured to monitor an output of the optical modulator 114. For example, the photodetector 116 may be optically coupled to the output of the optical modulator 114. As an example, for the single output of the optical modulator 114, the single output may be tapped and coupled to the photodetector 116 (e.g., an in-line tap photodetector). As another example, for the complementary outputs of the optical modulator 114, the photodetector 116 may be coupled to a complementary output (e.g., a complementary tap output (CTAP) photodetector). In some implementations, the photodetector 116 may be configured to monitor an output of the optical amplifier 112. For example, the photodetector 116 may be optically coupled to the output of the optical amplifier 112. As an example, an output from the optical amplifier 112 to the optical modulator 114 may be tapped and coupled to the photodetector 116. In some implementations, in a direct modulation scheme, the photodetector 116 may be configured to monitor an output of the optical source 110. For example, the photodetector 116 may be optically coupled to the optical source 100. As an example, the photodetector 116 may be optically coupled to a back facet of the optical source 110.

The controller 108 may be configured to output the secondary data signal to the transmitter device 106. For example, the controller 108 may include a digital-to-analog converter (DAC) 118 configured to output the secondary data signal. As described herein, the controller 108 may control the secondary data signal output to the transmitter device 106 in order to control a modulation index of the optical signal modulated with the secondary data signal. For example, the secondary data signal has a modulation amplitude (e.g., an amplitude of a current of the secondary data signal) to control modulating of the optical signal by the optical amplifier 112 of the transmitter device 106. In some implementations, the secondary data signal may be based on (e.g., may encode data using) Manchester encoding.

As described above, based on the controller 108 outputting the secondary data signal to the transmitter device 106, the transmitter device 106 may modulate the optical signal with the secondary data signal, and the photodetector 116 may generate the feedback signal based on the optical signal modulated with at least the secondary data signal. Thus, based on outputting the secondary data signal to the optical amplifier 112, the controller 108 may be configured to obtain the feedback signal output by the photodetector 116. In some implementations, the controller 108 may obtain the feedback signal directly from the photodetector 116. In some implementations, the optical transmitter 102 may include a filter 120 configured to filter the feedback signal (e.g., filter noise and/or the primary data signal). For example, the photodetector 116 may be configured to output the feedback signal to the filter 120, and the filter 120 may be configured to output the filtered feedback signal to the controller 108. The filter 120 may include a low-pass filter (e.g., configured to filter out frequencies associated with the primary data signal).

The controller 108 may be configured to determine, based on the feedback signal, an actual modulation index of the optical signal modulated with at least the secondary data signal (e.g., the optical signal modulated with the primary data signal and the secondary data signal, or the optical signal modulated with only the secondary data signal, prior to modulation with the primary data signal). The actual modulation index may indicate a relationship between an amplitude of the secondary data signal and an amplitude of the unmodulated optical signal (e.g., may indicate by how much the modulating secondary data signal is affecting the optical signal).

In some implementations, to determine the actual modulation index, the controller 108 may obtain a plurality of samples of the feedback signal. For example, the controller 108 may include an analog-to-digital converter (ADC) 122 configured to sample the feedback signal. The feedback signal may be sampled at intervals corresponding to a data rate of the secondary data signal. In some implementations, the feedback signal may be sampled at intervals corresponding to a rate faster than the data rate of the secondary data signal. In some implementations, the feedback signal may be sampled at random intervals. The plurality of samples obtained by the controller 108 may include a plurality of high level samples and a plurality of low level samples. For example, the plurality of high level samples may be collected at or near a maximum amplitude of the secondary data signal, and the plurality of low level samples may be collected at or near a minimum amplitude of the secondary data signal.

In some implementations, the controller 108 may process the plurality of high level samples and the plurality of low level samples to correct for nonlinearities (e.g., between photodetector 116 current and optical power). Based on the plurality of high level samples and the plurality of low level samples, the controller 108 may determine a high level value and a low level value, respectively. As described below, the controller 108 can use the high level value and the low level value to determine a modulation index.

In some examples, the high level value may be an average high level value of the plurality of high level samples, and the low level value may be an average low level value of the plurality of low level samples, where the average may be taken over a time period greater than the time between sampling intervals. For example, the average high level value and the average low level value may be proportional to an optical power reaching the photodetector 116 (e.g., such that conversion to optical power values, as described below, is not needed). In some examples, the high level value may be a first optical power value obtained by converting the average high level value to the first optical power value, and the low level value may be a second optical power value obtained by converting the average low level value to the second optical power value (e.g., using a polynomial that is particular to a channel of the optical source 110 associated with the optical signal). The high level value may be denoted P (1) and the low level value may be denoted P (0). Accordingly, the controller 108 may determine the actual modulation index based on the high level value and the low level value (e.g., using the average high level and low level values, if the photodetector 116 current and optical power are linear, or using the first and second optical power values if the photodetector 116 current and optical power are nonlinear). For example, the actual modulation index may be determined using Equation 1:

$$\frac{P(1) - P(0)}{P(1) + P(0)} \qquad \text{Equation 1}$$

The controller 108 may be configured to adjust the modulation amplitude of the secondary data signal based on a difference between the actual modulation index and a target modulation index. For example, the controller 108 may adjust a current for the secondary data signal based on the difference between the actual modulation index and the target modulation index (e.g., using an algorithm correlating a modulation index difference to a current adjustment). The adjustment of the modulation amplitude may be intended to reduce the difference between the actual modulation index and the target modulation index to zero. The controller 108 may store information indicating the target modulation index (e.g., the target modulation index may be a configured value). For example, the target modulation index may be in a range from 3% to 10%.

The controller 108 may be configured to determine the actual modulation index, and to adjust the modulation amplitude of the secondary data signal based on the difference between the actual modulation index and the target modulation index, using a modulation amplitude controller 124. The modulation amplitude controller 124 may be implemented as hardware or software of the optical transmitter 102. For example, the modulation amplitude controller 124 may be provided in a firmware, a field-programmable gate array (FPGA), an application-specific integrated circuit (ASIC), or as instructions in a memory of the optical transmitter 102.

Adjusting the modulation amplitude (e.g., modulating the current) of the secondary data signal output to the transmitter device 106 may cause the transmitter device 106 to adjust the modulation of the optical signal with the secondary data signal (e.g., to match, or more closely match the actual modulation index to the target modulation index). For example, adjusting the modulation amplitude of the secondary data signal output to the optical amplifier 112 may cause the optical amplifier 112 to adjust an amplitude used for modulation of the optical signal with the secondary data signal. By adjusting the modulation amplitude of the secondary data signal based on the feedback signal in this manner, the controller 108 may maintain the actual modulation index at a relatively constant value (e.g., that is at or near the target modulation index).

As indicated above, FIG. 1 is provided as an example. Other examples may differ from what is described with regard to FIG. 1.

Figure 2:
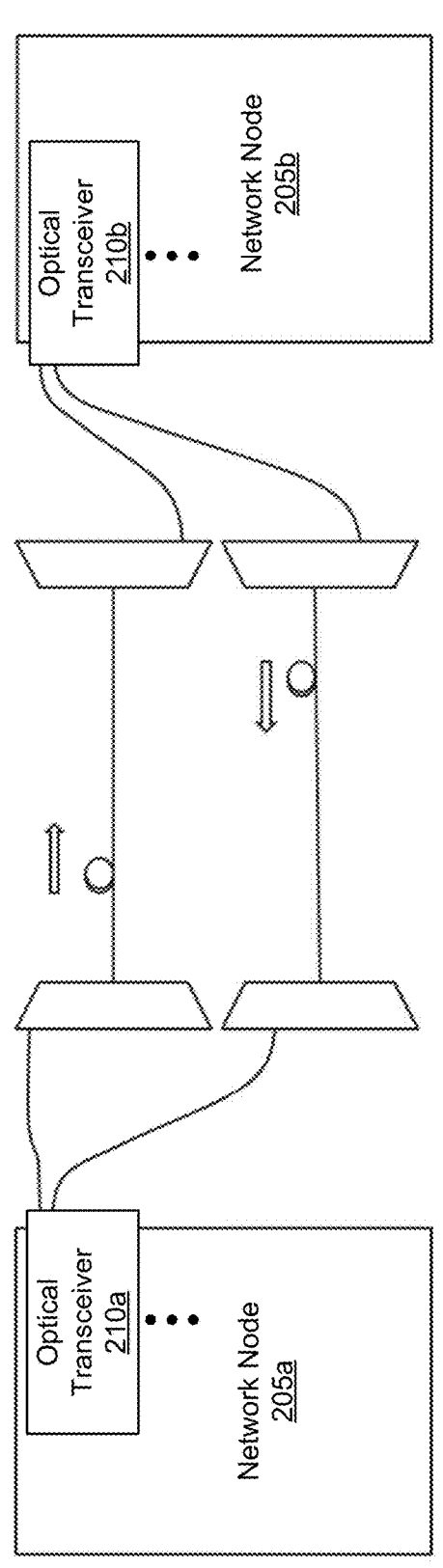
FIG. 2 is a diagram of an example environment in which systems and/or methods described herein may be implemented.

FIG. 2 is a diagram of an example environment 200 in which systems and/or methods described herein may be implemented. As shown in FIG. 2, environment 200 may include a network node 205*a* and a network node 205*b*.

The network node 205*a* includes one or more devices capable of receiving, generating, storing, processing, providing, and/or routing information associated with communications with the network node 205*b*, as described elsewhere herein. The network node 205*a* may include a tail end node. For example, the network node 205*a* may include a baseband unit of a wireless network. In some implementations, the network node 205*a* may include a distributed unit of a hub site of a wireless network. As shown, the network node 205*a* may include one or more optical transceivers 210*a*. An optical transceiver 210*a* may include the optical transmitter 102 and/or the optical receiver 104, described herein.

The network node 205*b* includes one or more devices capable of receiving, generating, storing, processing, providing, and/or routing information associated with communications with the network node 205*a*, as described elsewhere herein. The network node 205*b* may include a head end node. For example, the network node 205*b* may include a radio head of a wireless network. In some implementations, the network node 205*b* may include a radio unit of a cell site of a wireless network. As shown, the network node 205*b* may include one or more optical transceivers 210*b*. An optical transceiver 210*b* may include the optical transmitter 102 and/or the optical receiver 104 described herein.

The optical transceiver(s) 210*a* of the network node 205*a* and the optical transceiver(s) 210*b* of the network node 205*b* may communicate via a fiber optic network. In some implementations, the optical transceiver(s) 210*a* of the network node 205*a* and the optical transceiver(s) 210*b* of the network node 205*b* may communicate on backhaul links or fronthaul links.

The number and arrangement of devices and networks shown in FIG. 2 are provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of environment 200 may perform one or more functions described as being performed by another set of devices of environment 200.

Figure 3:
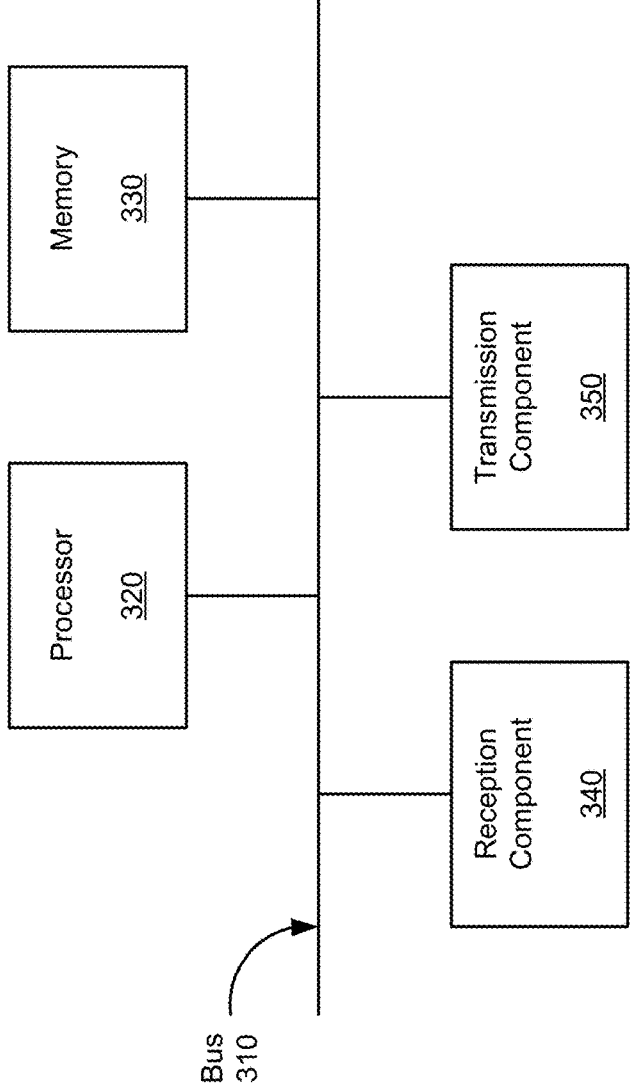
FIG. 3 is a diagram of example components of a device.

FIG. 3 is a diagram of example components of a device 300, which may correspond to the network node 205*a*, the network node 205*b*, the optical transceiver 210*a*, and/or the optical transceiver 210*b*. In some implementations, the network node 205*a*, the network node 205*b*, the optical transceiver 210*a*, and/or the optical transceiver 210*b* include one or more devices 300 and/or one or more components of device 300. As shown in FIG. 3, device 300 may include a bus 310, a processor 320, a memory 330, a reception component 340, and a transmission component 350.

Bus 310 includes one or more components that enable wired and/or wireless communication among the components of device 300. Bus 310 may couple together two or more components of FIG. 3, such as via operative coupling, communicative coupling, electronic coupling, and/or electric coupling. Processor 320 includes a central processing unit, a graphics processing unit, a microprocessor, a controller, a microcontroller, a digital signal processor, a field-programmable gate array, an application-specific integrated circuit, and/or another type of processing component (e.g., a microcontroller unit and/or a controller of an optical transceiver). Processor 320 may include a low-precision clock. Processor 320 is implemented in hardware, firmware, software, or combinations thereof. In some implementations, processor 320 includes one or more processors capable of being programmed to perform one or more operations or processes described elsewhere herein.

Memory 330 includes volatile and/or nonvolatile memory. For example, memory 330 may include random access memory (RAM), read only memory (ROM), a hard disk drive, and/or another type of memory (e.g., a flash memory, a magnetic memory, and/or an optical memory), for example, to store firmware within an optical transceiver. Memory 330 may include internal memory (e.g., RAM, ROM, or a hard disk drive) and/or removable memory (e.g., removable via a universal serial bus connection). Memory 330 may be a non-transitory computer-readable medium. Memory 330 stores information, instructions, and/or software (e.g., one or more software applications) related to the operation of device 300. In some implementations, memory 330 includes one or more memories that are coupled to one or more processors (e.g., processor 320), such as via bus 310.

Reception component 340 enables device 300 to receive signals (e.g., optical signals). For example, reception component 340 may include a reception optical subassembly that converts optical signals (e.g., received in an optical network) into electrical signals. Transmission component 350 enables device 300 to transmit signals (e.g., optical signals). For example, transmission component 350 may include a transmission optical subassembly that converts electrical signals into optical signals (e.g., for transmission in an optical network).

Device 300 may perform one or more operations or processes described herein (including, for example, processes and operations performed by a controller of an optical transceiver). For example, a non-transitory computer-readable medium (e.g., memory 330) may store a set of instructions (e.g., one or more instructions or code) for execution by processor 320. Processor 320 may execute the set of instructions to perform one or more operations or processes described herein. In some implementations, execution of the set of instructions, by one or more processors 320, causes the one or more processors 320 and/or the device 300 to perform one or more operations or processes described herein. In some implementations, hardwired circuitry is used instead of or in combination with the instructions to perform one or more operations or processes described herein. Additionally, or alternatively, processor 320 may be configured to perform one or more operations or processes described herein. Thus, implementations described herein are not limited to any specific combination of hardware circuitry and software.

The number and arrangement of components shown in FIG. 3 are provided as an example. Device 300 may include additional components, fewer components, different components, or differently arranged components than those shown in FIG. 3. Additionally, or alternatively, a set of components (e.g., one or more components) of device 300 may perform one or more functions described as being performed by another set of components of device 300.

FIG. 4 is a flowchart of an example process 400 associated with control of a modulation index of an optical signal. In some implementations, one or more process blocks of FIG. 4 are performed by a controller (e.g., controller 108). Additionally, or alternatively, one or more process blocks of FIG. 4 may be performed by one or more components of device 300, such as processor 320, memory 330, reception component 340, and/or transmission component 350.

As shown in FIG. 4, process 400 may include outputting a low-speed data signal to a transmitter device, where the low-speed data signal has a modulation amplitude to control modulating of an optical signal by the transmitter device (block 410). For example, the controller may output a low-speed data signal to a transmitter device, as described above. In some implementations, the optical signal is to be modulated with a high-speed data signal and the low-speed data signal. In some implementations, the low-speed data signal indicates diagnostic information, associated with a controlled network node of an optical network, and for a controlling network node of the optical network. In some implementations, the low-speed data signal is based on Manchester encoding. In some implementations, a data rate of the low-speed data signal is less than or equal to 10 kbps, and a data rate of the high-speed data signal is greater than or equal to 1 Gbps.

As further shown in FIG. 4, process 400 may include obtaining, based on outputting the low-speed data signal to the transmitter device, a feedback signal generated by a photodetector based on the optical signal modulated with at least the low-speed data signal (block 420). For example, the controller may obtain, based on outputting the low-speed data signal to the transmitter device, a feedback signal generated by a photodetector based on the optical signal modulated with at least the low-speed data signal, as described above.

As further shown in FIG. 4, process 400 may include determining, based on the feedback signal, an actual modulation index of the optical signal modulated with at least the low-speed data signal (block 430). For example, the controller may determine, based on the feedback signal, an actual modulation index of the optical signal modulated with at least the low-speed data signal, as described above. In some implementations, determining the actual modulation index of the optical signal may include obtaining a plurality of samples of the feedback signal, where the plurality of samples include a plurality of high level samples and a plurality of low level samples, determining a high level value based on the plurality of high level samples and a low level value based on the plurality of low level samples, and determining the actual modulation index based on the high level value and the low level value. In some implementations, determining the high level value and the low level value may include determining an average high level value of the plurality of high level samples and an average low level value of the plurality of low level samples, and converting the average high level value to a first optical power value and the average low level value to a second optical power value, where the high level value is the first optical power value, and the low level value is the second optical power value.

As further shown in FIG. 4, process 400 may include adjusting the modulation amplitude of the low-speed data signal based on a difference between the actual modulation index and a target modulation index (block 440). For example, the controller may adjust the modulation amplitude of the low-speed data signal based on a difference between the actual modulation index and a target modulation index, as described above. In some implementations, the target modulation index is in a range from 3% to 10%.

Although FIG. 4 shows example blocks of process 400, in some implementations, process 400 includes additional blocks, fewer blocks, different blocks, or differently arranged blocks than those depicted in FIG. 4. Additionally, or alternatively, two or more of the blocks of process 400 may be performed in parallel.

The foregoing disclosure provides illustration and description, but is not intended to be exhaustive or to limit the implementations to the precise forms disclosed. Modifications and variations may be made in light of the above disclosure or may be acquired from practice of the implementations. Furthermore, any of the implementations described herein may be combined unless the foregoing disclosure expressly provides a reason that one or more implementations may not be combined.

As used herein, the term "component" is intended to be broadly construed as hardware, firmware, and/or a combination of hardware and software. It will be apparent that systems and/or methods described herein may be implemented in different forms of hardware, firmware, or a combination of hardware and software. The actual specialized control hardware or software code used to implement these systems and/or methods is not limiting of the implementations. Thus, the operation and behavior of the systems and/or methods are described herein without reference to specific software code—it being understood that software and hardware can be designed to implement the systems and/or methods based on the description herein.

Even though particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set. As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiple of the same item.

When a component or one or more components (e.g., a laser emitter or one or more laser emitters) is described or claimed (within a single claim or across multiple claims) as performing multiple operations or being configured to perform multiple operations, this language is intended to broadly cover a variety of architectures and environments. For example, unless explicitly claimed otherwise (e.g., via the use of "first component" and "second component" or other language that differentiates components in the claims), this language is intended to cover a single component performing or being configured to perform all of the operations, a group of components collectively performing or being configured to perform all of the operations, a first component performing or being configured to perform a first operation and a second component performing or being configured to perform a second operation, or any combination of components performing or being configured to perform the operations. For example, when a claim has the form "one or more components configured to: perform X; perform Y; and perform Z," that claim should be interpreted to mean "one or more components configured to perform X; one or more (possibly different) components configured to perform Y; and one or more (also possibly different) components configured to perform Z."

No element, act, or instruction used herein should be construed as critical or essential unless explicitly described as such. Also, as used herein, the articles "a" and "an" are intended to include one or more items, and may be used interchangeably with "one or more." Further, as used herein, the article "the" is intended to include one or more items referenced in connection with the article "the" and may be used interchangeably with "the one or more." Furthermore, as used herein, the term "set" is intended to include one or more items (e.g., related items, unrelated items, or a combination of related and unrelated items), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. An optical transmitter, comprising:
an optical source configured to output an optical signal that is to be modulated with a primary data signal and a secondary data signal,
wherein a data rate of the primary data signal is greater than a data rate of the secondary data signal;

a semiconductor optical amplifier configured to modulate the optical signal with the secondary data signal;

an optical modulator configured to modulate the optical signal with the primary data signal;

a photodetector configured to generate a feedback signal based on the optical signal modulated with at least the secondary data signal; and a controller configured to:

output the secondary data signal to the semiconductor optical amplifier, wherein the secondary data signal has a modulation amplitude to control a modulation of the optical signal by the semiconductor optical amplifier;

obtain the feedback signal based on outputting the secondary data signal to the semiconductor optical amplifier;

determine, based on the feedback signal, an actual modulation index of the optical signal modulated with at least the secondary data signal; and adjust the modulation amplitude of the secondary data signal based on a difference between the actual modulation index and a target modulation index.

2. The optical transmitter of claim 1, wherein the controller, to determine the actual modulation index, is configured to:

obtain a plurality of samples of the feedback signal, wherein the plurality of samples include a plurality of high level samples and a plurality of low level samples;

determine a high level value based on the plurality of high level samples and a low level value based on the plurality of low level samples; and determine the actual modulation index based on the high level value and the low level value.

3. The optical transmitter of claim 2, wherein the controller, to determine the high level value and the low level value, is configured to:

determine an average high level value of the plurality of high level samples and an average low level value of the plurality of low level samples; and convert the average high level value to a first optical power value and the average low level value to a second optical power value, wherein the high level value is the first optical power value, and the low level value is the second optical power value.

4. The optical transmitter of claim 1, wherein the photodetector is optically coupled to an output of the optical modulator.

5. The optical transmitter of claim 1, wherein the photodetector is optically coupled to an output of the semiconductor optical amplifier.

6. The optical transmitter of claim 1, further comprising:

a filter configured to filter the feedback signal, wherein the photodetector is configured to output the feedback signal to the filter.

7. The optical transmitter of claim 1, wherein the optical modulator includes a Mach-Zehnder modulator.

8. An optical transmitter, comprising:

a transmitter device configured to modulate an optical signal with a data signal; and a controller configured to:

output the data signal to the transmitter device, wherein the data signal has a modulation amplitude to control a modulation of the optical signal by the transmitter device;

obtain a feedback signal based on outputting the data signal to the transmitter device;

determine, based on the feedback signal, an actual modulation index of the optical signal modulated with the data signal; and adjust the modulation amplitude of the data signal based on a difference between the actual modulation index and a target modulation index.

9. The optical transmitter of claim 8, wherein the transmitter device comprises:

a semiconductor optical amplifier configured to modulate the optical signal with the data signal.

10. The optical transmitter of claim 8, further comprising:

a photodetector configured to generate the feedback signal based on the optical signal modulated with the data signal.

11. The optical transmitter of claim 10, further comprising:

a filter configured to filter the feedback signal, wherein the photodetector is configured to output the feedback signal to the filter.

12. The optical transmitter of claim 8, wherein the controller comprises an analog-to-digital converter configured to sample the feedback signal.

13. The optical transmitter of claim 8, wherein the controller comprises a digital-to-analog converter configured to output the data signal.

14. The optical transmitter of claim 8, wherein the controller, to determine the actual modulation index, is configured to:

obtain a plurality of samples of the feedback signal, wherein the plurality of samples include a plurality of high level samples and a plurality of low level samples;

determine a high level value based on the plurality of high level samples and a low level value based on the plurality of low level samples; and determine the actual modulation index based on the high level value and the low level value.

15. A method, comprising:

outputting, by a controller, a low-speed data signal to a transmitter device, wherein the low-speed data signal has a modulation amplitude to control a modulation of an optical signal by the transmitter device, wherein the optical signal is to be modulated with a high-speed data signal and the low-speed data signal, and wherein the low-speed data signal indicates diagnostic information, associated with a controlled network node of an optical network, and for a controlling network node of the optical network;

obtaining, by the controller and based on outputting the low-speed data signal to the transmitter device, a feedback signal generated by a photodetector based on the optical signal modulated with at least the low-speed data signal;

determining, by the controller and based on the feedback signal, an actual modulation index of the optical signal modulated with at least the low-speed data signal; and adjusting, by the controller, the modulation amplitude of the low-speed data signal based on a difference between the actual modulation index and a target modulation index.

16. The method of claim 15, wherein the low-speed data signal is based on Manchester encoding.

17. The method of claim 15, wherein a data rate of the low-speed data signal is less than or equal to 10 kilobits per second, and a data rate of the high-speed data signal is greater than or equal to 1 gigabit per second.

18. The method of claim 15, wherein determining the actual modulation index of the optical signal comprises:

obtaining a plurality of samples of the feedback signal, wherein the plurality of samples include a plurality of high level samples and a plurality of low level samples;

determining a high level value based on the plurality of high level samples and a low level value based on the plurality of low level samples; and determining the actual modulation index based on the high level value and the low level value.

19. The method of claim 18, wherein determining the high level value and the low level value comprises:

determining an average high level value of the plurality of high level samples and an average low level value of the plurality of low level samples; and converting the average high level value to a first optical power value and the average low level value to a second optical power value, wherein the high level value is the first optical power value, and the low level value is the second optical power value.

20. The method of claim 15, wherein the target modulation index is in a range from 3% to 10%.

*    *    *    *    *